(12) United States Patent
Wei

(10) Patent No.: US 9,465,626 B2
(45) Date of Patent: Oct. 11, 2016

(54) METHOD AND APPARATUS FOR ACQUIRING TIME SPENT ON SYSTEM SHUTDOWN

(71) Applicant: TENCENT TECHNOLOGY (SHENZHEN) COMPANY LIMITED, Shenzhen, Guangdong (CN)

(72) Inventor: Xue Wei, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 209 days.

(21) Appl. No.: 14/315,887

(22) Filed: Jun. 26, 2014

(65) Prior Publication Data

US 2014/0310508 A1    Oct. 16, 2014

Related U.S. Application Data

(63) Continuation of application No. PCT/CN2014/070006, filed on Jan. 2, 2014.

(30) Foreign Application Priority Data

Mar. 15, 2013 (CN) .......................... 2013 1 0083992

(51) Int. Cl.
   *G06F 9/44* (2006.01)
(52) U.S. Cl.
   CPC ..................... *G06F 9/442* (2013.01)
(58) Field of Classification Search
   CPC ........................................................ G06F 9/442
   USPC ........................................................ 713/502
   See application file for complete search history.

(56) References Cited

U.S. PATENT DOCUMENTS

| | | | | |
|---|---|---|---|---|
| 6,170,064 B1 * | 1/2001 | Lee | ....................... | G06F 11/324 |
| | | | | 702/178 |
| 8,060,605 B1 * | 11/2011 | Manuilov | .............. | G06F 9/4401 |
| | | | | 709/223 |
| 2005/0052805 A1 * | 3/2005 | Sato | ........................ | H02J 9/06 |
| | | | | 713/340 |

FOREIGN PATENT DOCUMENTS

| | | | |
|---|---|---|---|
| CN | 101222735 A | 7/2008 |
| CN | 101281416 A | 10/2008 |
| CN | 102591769 A | 7/2012 |
| CN | 102761667 A | 10/2012 |
| CN | 103150247 A | 6/2013 |

OTHER PUBLICATIONS

Stack Overflow, "What Happens During the Shutdown Process of an OS?", Feb. 28, 2010, StackOverflow.com, pp. 1-4.*
International Search Report, dated Mar. 27, 2014, pp. 1-3, International Patent Application No. PCT/CN2014/070006, The State Intellectual Property Office of China, Beijing, the P.R. China.

* cited by examiner

*Primary Examiner* — Dennis M Butler
(74) *Attorney, Agent, or Firm* — Brinks Gilson & Lione

(57) ABSTRACT

A method for determining time spent on system shutdown is provided. The method may involve identifying a time at which a shutdown instruction is initiated during the system shutdown. Further, an exit time of an object that is the last to exit during the system shutdown may be identified. The time spent on the system shutdown may be determined based on the time at which the shutdown instruction is initiated and the exit time of the object that is the last to exit. The method for determining time spent on system shutdown may obtain the system time spent on the previous system shutdown regardless of the reason that the system was shut down. Further, the user may be instructed to optimize the system according to the time spent on system shutdown.

5 Claims, 3 Drawing Sheets

| ⓘ | Error | 2012/12/18 20:46:21 | DistributedCOM | 10010 | None |
|---|---|---|---|---|---|
| ⓘ | Info | 2012/12/18 20:46:21 | USER32 | 1074 | None |
| ⓘ | Info | 2012/12/18 20:46:33 | USER32 | 1074 | None |
| ⓘ | Info | 2012/12/18 20:46:33 | Winlogon | 7002 | (1102) |
| ⓘ | Info | 2012/12/18 20:46:34 | WindowsUpdateClient | 27 | Windows Update Proxy |
| ⓘ | Info | 2012/12/18 20:46:34 | Service Control Manager | 7036 | None |
| ⓘ | Info | 2012/12/18 20:46:34 | Service Control Manager | 7036 | None |
| ⓘ | Info | 2012/12/18 20:46:35 | Service Control Manager | 7036 | None |

Event 1074, USER32

| Regular | Description |

The Process Explorer.EXE has initiated the power off computer SNOWWEI-PC0 for the following reason Other (unplanned)

Reason Code: 0x0

Shutdown Type: power off

Comment:

FIG. 3

| ⓘ | Info | 2012/12/18 20:46:42 | Service Control Manager | 7036 | None |
|---|---|---|---|---|---|
| ⓘ | Info | 2012/12/18 20:46:42 | Service Control Manager | 109 | (103) |
| ⓘ | Info | 2012/12/18 20:46:47 | Service Control Manager | 13 | None |
| ⓘ | Info | 2012/12/19 8:57:07 | Service Control Manager | 12 | None |

Event 13, USER32

| Regular | Description |

The operating system will be shutdown at system time 2012 – 12 – 18T12:46:47.898620300Z

FIG. 4

METHOD AND APPARATUS FOR ACQUIRING TIME SPENT ON SYSTEM SHUTDOWN

This application claims priority to and is a continuation of PCT/CN2014/070006, filed on Jan. 2, 2014 and entitled "METHOD AND APPARATUS FOR ACQUIRING TIME SPENT ON SYSTEM SHUTDOWN", which claims priority to Chinese Patent Application No. 201310083992.4, entitled "METHOD AND APPARATUS FOR ACQUIRING TIME SPENT ON SYSTEM SHUTDOWN", filed with State Intellectual Property Office of PRC on Mar. 15, 2013, which are incorporated herein by reference in their entireties.

TECHNICAL FIELD

The present disclosure relates to the field of testing technology, and in particular to a method and an apparatus for determining time spent on system shutdown.

BACKGROUND

Once a system, such as a computer, is started up, generally a prompt may provide information such as time spent on booting the system. However, in addition, or alternatively, time spent on system shutdown may be an important factor to determine.

Typically, rebooting the system includes time for system booting and time for system shutdown. The time spent on system shutdown may be calculated by determining the time for a system reboot and the time spent on a system boot (or system startup).

However, this technique may only help to determine the time spent on system shutdown in case a system reboot is performed, and not in a normal shutdown or any other shutdown that is not initiated by a system reboot.

SUMMARY

The embodiments of the present disclosure provide a method for determining time spent on a system shutdown. The method may enable determining the time spent on the system shutdown during the system reboot, regardless of the reason that the system is shut down before. The user may be able to optimize the system according to the time spent on system shutdown. The embodiments of the present disclosure also provide an apparatus to determine the duration of a system shutdown.

According to an embodiment of the present disclosure, a method for acquiring time spent on a previous system shutdown may include at least the following steps. Initially, a time, or an instant of time, at which a shutdown instruction that may have caused the system shutdown was initiated, is identified. Further, an exit time of an object that was the last to exit during the system shutdown is identified. The time spent on the system shutdown may then be determined according to the time at which the shutdown instruction was initiated and the exit time of the object that was the last to exit.

Identifying the time at which the shutdown instruction was initiated during the system shutdown may include identifying an occurring time, or occurrence time of a system event that is representative of the system shutdown. Such a system shutdown may be identified as the system event that has the earliest occurring time, according to a system log, during the system shutdown. The exit time of the object that is the last to exit during the system shutdown may include determining occurring time of a system event that has a latest occurring time, according to the system log, during the system shutdown. Determining the time spent on the system shutdown may then be done according to the occurring time of the system event that has the earliest occurring time and the occurring time of the system event that has the latest occurring time in the system log.

In another example, identifying the time at which a shutdown instruction was may include determining a time at which an object that is the first to receive the shutdown instruction received the shutdown instruction during the system shutdown. An exit time of an object that is the last to exit during the system shutdown may be determined as an exit time of an object that was the last to receive the shutdown instruction during the system shutdown. The time spent on the system shutdown may be determined according to the time at which the object that was the first to receive the shutdown instruction received the shutdown instruction and the exit time of the object that was the last to receive the shutdown instruction.

Determining a time at which a shutdown instruction was initiated during the system shutdown may include at least the following steps. An object that is preset to receive the shutdown instruction the earliest during a system shutdown may be identified. The time at which the preset object received the shutdown instruction may be used as the time at which the shutdown instruction was initiated. Further, an object that is preset to receive the shutdown instruction the last during a system shutdown may be identified and the time such a preset object received the system shutdown instruction may be used as the exit time of the object that was the last to receive the shutdown instruction. Next, the time spent on the system shutdown may be calculated according to the time at which the object that is preset to receive the shutdown instruction the earliest received the shutdown instruction and the exit time of the object that is preset to receive the shutdown instruction the last received shutdown instruction.

Prior to determining time at which a shutdown instruction is initiated during the system shutdown, the method may involve searching, for each object in the system, a corresponding time, or timestamp, at which the respective object received the shutdown instruction and an exit time of the respective object during the system shutdown.

As a second embodiment of the present disclosure, a terminal, may include a first acquisition unit, a second acquisition unit, and a calculation unit. The first acquisition unit may determine a time at which a shutdown instruction is initiated during the system shutdown. The second acquisition unit may determine an exit time of an object that is the last to exit during the system shutdown. The calculation unit may determine the time spent on the system shutdown based on the time at which the shutdown instruction is initiated and the exit time of the object that is the last to exit.

The first acquisition unit may determine the time at which the shutdown instruction is initiated by identifying an occurring time of a system event with the earliest occurring time from a system log. The system log may be recorded during the system shutdown. The second acquisition unit may determine an occurring time of a system event with the latest occurring time from the system log. The calculation unit may determine the time spent on the system shutdown based on the occurring time of the system event with the earliest occurring and the occurring time of the system event with the latest occurring time.

The first acquisition unit may, alternatively, or in addition, determine a time at which an object that is the first to receive the shutdown instruction receives the shutdown instruction during the system shutdown. The second acquisition unit may, alternatively, or in addition, determine an exit time of an object that is the last to receive the shutdown instruction during the system shutdown. In such a case, the calculation unit may determine the time spent on the system shutdown based on the time at which the object that is the first to receive the shutdown instruction receives the shutdown instruction, and the exit time of the object that is the last to receive the shutdown instruction.

In yet another example, the first acquisition unit may identify a first object that may be preset to receive the shutdown instruction the earliest in each system shutdown. The first acquisition unit may further determine the time at which the first preset object receives the shutdown instruction. The second acquisition unit may identify a second object that may be preset to receive the shutdown instruction the last in each system shutdown. The second acquisition unit may further determine an exit time of the second object. Subsequently, the calculation unit may determine the time spent on the system shutdown based on the time at which the first object receives the shutdown instruction, and the exit time of the second object.

The terminal further may further include a searching unit. The searching unit may search records for each object in the system. The search may be performed on a system log that may be recorded during the previous system shutdown. The searching unit may determine, based on the search, a time at which an object received the shutdown instruction and an exit time of the object during the system shutdown.

A third embodiment of the present disclosure may involve non-transitory storage medium(s) in which executable instructions are contained. The executable instructions, when executed by circuitry, such as one or more processors may determine the time spent on system shutdown. The storage medium may contain instructions, which when executed, result in at least the following operations. For example, a shutdown instruction may be initiated during the system shutdown. An exit time of an object that is the last to exit during the system shutdown may be recorded and identified. Further, the time spent on the system shutdown may be calculated according to the time at which the shutdown instruction is initiated and the exit time of the object that is the last to exit.

In the embodiments of the present disclosure, the time at which the shutdown instruction is initiated during the system shutdown may be determined. The exit time of the object that is the last to exit during the system shutdown may be determined. The time spent on the system shutdown may be subsequently determined according to the time at which the shutdown instruction is initiated and the exit time of the object that is the last to exit. Thereby, not only can the time spent on system shutdown be determined in case of a system rebooting process, but also during other types of, or cases of system shutdown. The method for determining the time spent on system shutdown provided according to the embodiments of the present disclosure can determine the time spent on the system shutdown each time the system is booted up, or is started regardless of the reason the system was shut down previously. The user may be instructed to optimize the system according to the time spent on system shutdown.

BRIEF DESCRIPTION OF THE DRAWINGS

FIG. 3 shows an example use case of an embodiment of the present disclosure;

FIG. 4 shows an example use case of an embodiment of the present disclosure;

DETAILED DESCRIPTION

A method for determining time spent on system shutdown is described further. The method enables determining duration of the previous system shutdown when the system is restarted. The previous system shutdown time may be determined regardless of the reason that the system was shut down before. Knowing the shutdown time may allow the user to optimize the system. Further, an apparatus to determine shutdown duration of a system is also described.

The technical solutions according to the embodiments of the present disclosure are described in conjunction with the accompany drawings. The described embodiments are only some of the various possible embodiments of the technical solutions provided by the present disclosure. Any other embodiment obtained by those skilled in the art based on the embodiments herein without inventive efforts falls within the scope of the present disclosure.

Figure 1:
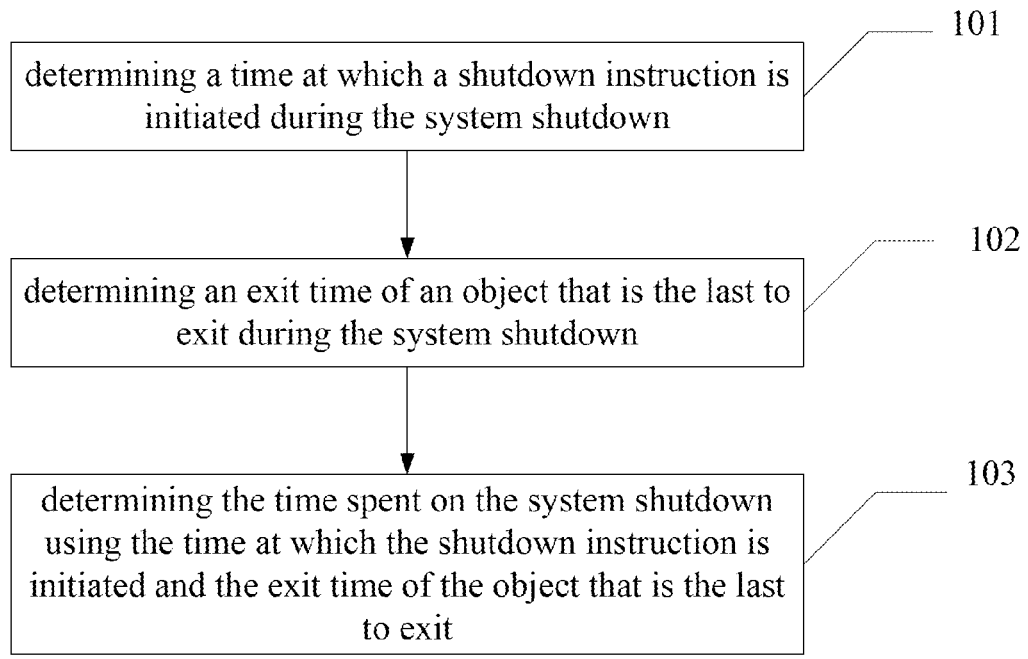
FIG. 1 shows a flowchart of an example method to determine duration of a system shutdown.

Referring to FIG. 1, an example method for determining time spent on system shutdown may include steps 101 to 103.

101 may involve identifying a time at which a shutdown instruction was initiated during the system shutdown.

102 may involve identifying an exit time of an object that is the last object to exit during the system shutdown.

103 may further involve determining the time spent on the system shutdown based on the time at which the shutdown instruction is initiated and the exit time of the object that is the last to exit.

The method for determining the time spent on system shutdown provided may be used to determine the time spent on the previous system shutdown each time the system is started. Thus, the shutdown duration may be determined regardless of the reason that the system was shut down before. The determined system shutdown time may be displayed to so the user who may be subsequently instructed to optimize the system based on the time spent on the system shutdown.

Figure 2:
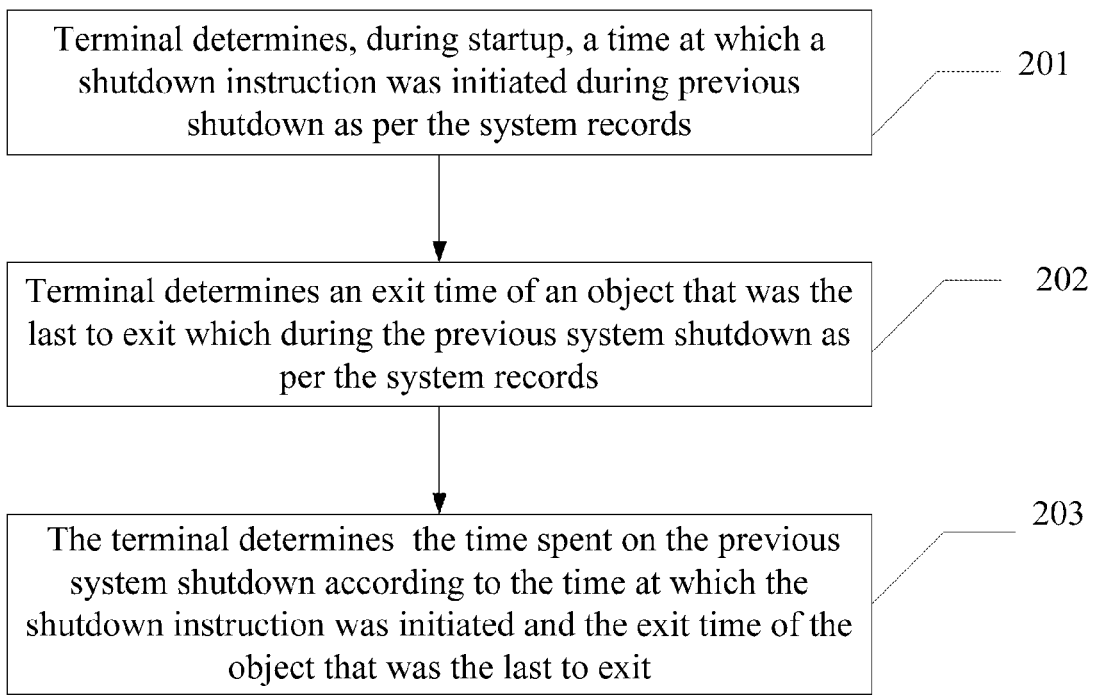
FIG. 2 shows a flowchart of an example method to determine duration of a system shutdown.

Referring to FIG. 2, another example of the method for determining the time spent on system shutdown may include at least the steps 201 to 203.

201 may involve a terminal, during startup, identifying a time at which a shutdown instruction was initiated during a previous system shutdown. The shutdown initiation time may be recorded by the system during the last system shutdown. The time may be recorded as a timestamp in a log file at a predetermined location. Alternatively, the time may be recorded as part of the system record, such as in the system registry.

Each time a user starts the terminal, the terminal may identify the time at which the shutdown instruction was initiated during the last system shutdown by searching the system record. The terminal may have been shut down by powering off, rebooting or a as part of a normal shutdown procedure. Regardless of why and/or how the last system shutdown was performed, the terminal may be able to determine the shutdown initiation time.

202 may involve the terminal identifying an exit time of an object that was the last to exit. The exit time of the last object may be recorded by the system during the last system shutdown.

An 'object' may be a program, or a software application, a module of a software application, or a background process or service executing on the system. Thus, in an example, the object that was the last to exit during the last system shutdown may be a program that was the last to exit during the last shutdown. The exit time of the object that was the last to exit may be understood, and/or used as the shutdown time of the terminal.

203 may involve the terminal determining the time spent on the last system shutdown based on the time at which the shutdown instruction was initiated and the exit time of the object that was the last to exit.

The time at which the shutdown instruction was initiated may be understood, and/or used as the earliest time at which the shutdown operation was initiated. The exit time of the object that was the last to exit may be understood, and/or used as the time at which the terminal was shut down or powered off. Therefore, the time spent on the last system shutdown may be determined, for example, by subtracting the time recorded by the system at which the shutdown instruction was initiated from the exit time of the object that was the last to exit.

Thus, determining the duration of the previous system shutdown, when the system is rebooting, booting, or starting up may include at least the following steps. The time at which the shutdown instruction was initiated for the last system shutdown may be identified. The shutdown initiation time may be recorded by the system during previous shutdown. Further, the object that was the last to exit during the last system shutdown may be identified. The time the last object exited may be recorded by the system during the shutdown. The exit time of the last object may be further identified. The time spent on the last system shutdown may be determined based on the time at which the shutdown instruction was initiated and the exit time of the object that was the last to exit. The method may be used to determine the time spent on the last system shutdown each time the system is started, regardless of the reason that the system was shut down before. The user may be instructed to optimize the system according to the time spent on system shutdown. Hence, the provided method may be advantageous over determining the time spent on system shutdown only during a system rebooting process.

In an example of determining the time spent on system shutdown identifying a time at which a shutdown instruction was initiated during the last system shutdown may include identifying the time of occurrence of a system event that was the earliest event recorded during the previous system shutdown. The earliest system event may be identified as the event that has the earliest occurrence time in a system log. The system log may be recorded by the system during the last system shutdown.

Determining the exit time of the object that was the last to exit during the last system shutdown may include identifying the time of occurrence of a system event that has the latest event recorded by the system during the last system shutdown. The latest system event may be identified as the event that has the latest occurrence time in the system log.

Determining, or obtaining the time spent on the last system shutdown according to the time at which the shutdown instruction was initiated and the exit time of the object that was the last to exit may include using the respective recorded occurrence times of the earliest occurring event and the latest occurring event according to the system log.

As an example, assume the system uses a Windows-based operating system (Windows), such as Windows 7, Windows 8 or any other version developed or based upon the operating system developed by Microsoft Corporation. The occurrence time of an event in the system may be recorded in a system log of Windows. The system log may be stored on a system disc. For example, in the case of Windows 7, the storage path of the system log may be "system disk:\Windows\System32\winevt\Logs\System.evtx" and in the case of Windows XP, the storage path of the system log may be "system installation disk:\Windows\System32\config\SysEvent.evt". By searching for event occurring times in the system log, the occurrence time of the system event that has the earliest occurring time may be identified. Similarly, the occurrence time of the system event that has the latest occurring time as recorded by the system during the last system shutdown may be acquired. The time spent on the last system shutdown may be determined by subtracting the occurrence time of the system event that has the earliest occurring time from the occurrence time of the system event that has the latest occurring time.

For example, as in an example use case illustrated by FIG. 3, the system log recorded during the last shutdown may be searched and the earliest and latest system events in the system log may be identified. For example, by searching the system log that was recorded during the last system shutdown, the earliest system event may be identified as the system event corresponding to event ID 1074 and with occurring time 20:46:21. Further, by searching the system log that was recorded during the last system shutdown, the system event that has the latest occurring time may be found as the system event with event ID 13 and occurring time 20:46:47. In this case, 26 seconds elapsed from the two occurrence times, 20:46:21 to 20:46:47. Thus, the time spent on the last system shutdown may be determined to be 26 seconds.

The time spent on the last system shutdown may be calculated during system booting. The determined time spent on the last system shutdown may be displayed after the booting. For example, the shutdown duration may be displayed on the system display so as to instruct the user to optimize the system in view of the time spent on the last system shutdown. Specific optimization schemes may be generated.

The Windows operating system is used as merely an example. The system may also be a Unix system, a Linux system, a MAC system, an Android system, or a system using any other operating system. Further examples are omitted here. However, the time spent on the last system shutdown may be acquired according to the technical solution provided by the embodiments of the present disclosure no matter what the operating system is.

Thus, an example method for determining a time spent on system shutdown may include at least the following steps.

A shutdown instruction time may be identified which may correspond to a shutdown being initiated. The shutdown instruction time may be identified based on a system log recorded by the system during the last system shutdown. The shutdown instruction time identification may further involve identifying an earliest object during the last shutdown. The earliest object may be the object that was the first to receive the shutdown instruction. The time at which the earliest object received the shutdown instruction may be recorded by the system during the last system shutdown. The time at which the shutdown instruction was received by the earliest object may be considered the shutdown instruction time.

Further, an exit time may be identified as the time at which the last object was shutdown during the last shutdown. The last object may be identified as the object that was the last to exit as recorded by the system during the last system shutdown. Identifying the exit time may involve identifying the last object and further identifying the exit time of the last object. The last object may be identified from the system records as the system event that was the last to receive the shutdown instruction.

Further yet, the time spent on the last system shutdown may be determined using the time at which the shutdown instruction was initiated and the exit time of the object that was the last to exit may. Thus, the last system shutdown duration may be determined according to the time at which the object that was the first to receive the shutdown instruction receives the shutdown instruction and the exit time of the object that was the last to receive the shutdown instruction.

In an example system, assume 50 programs are to be notified to exit for the system to shut down. The time at which each program receives the shutdown instruction and the exit time of each program will be recorded by the system. Then, by searching the system record and comparing the times, the exit time of the object that was the last to receive the shutdown instruction (exit time) and the time at which the object that was the first to receive the shutdown instruction (first shutdown instruction time) may be found. The time spent on the last system shutdown may be determined by subtracting the first shutdown time from the exit time.

Thus, another method for determining the time spent on system may include at least the following steps.

A time at which a shutdown instruction was initiated during the last system shutdown may be identified. The time may be recorded by the system. Identifying such a time may include identifying an object that is preset to receive the shutdown instruction the earliest. Thus, the time recorded by the system at which the preset object received the shutdown instruction may be identified as the time at which the last shutdown instruction was initated.

An exit time of an object that was the last to exit during the last system shutdown may be identified. The exit time may be recorded by the system. Identifying such an exit time may include identifying an object that is preset to acquire the shutdown instruction the last in each system shutdown. Thus, the time recorded by the system at which the preset object exited (or shutdown) may be identified as the exit time.

The time spent on the last system shutdown may be determined using the time at which the shutdown instruction is initiated and the exit time of the object that was the last to exit. Determining the time spent on the last system shutdown may further include calculating the time spent on the last system shutdown according to the time at which the object that acquires the shutdown instruction the earliest receives the shutdown instruction and the exit time of the object that obtains the shutdown instruction the last.

For example, among several programs in the system, two programs may be preset or predetermined to receive the shutdown instruction the first and at the last respectively. One of the programs may be a program that is preset as the first to receive the shutdown instruction in response to the shutdown instruction being initiated. The other, second, program may be a program that receives, and/or is preset to receive, the shutdown instruction the last during the shutdown. Thus, the time spent on the last system shutdown may be calculated from the times at which the two predetermined programs received the shutdown instruction and the exit times of the two predetermined programs. This may eliminate comparing the times at which all programs in the system received the shutdown instruction and the exit times of all the programs.

Thus, yet another example method for calculating time spent on system shutdown may include at least the following steps.

The method may involve identifying a time at which a shutdown instruction was initiated during the last system shutdown, and as recorded by the system. Identifying such time may further include search operations across each object in the system. For example, the search operation may search for a time at which the object received the shutdown instruction and an exit time of the object during the last system shutdown, as were recorded by the system. Thus, the search operations may involve identifying corresponding data in the system records.

Thus, the time at which each object received the shutdown instruction and the exit time of each object may be found from the system record. And by comparing one by one, the time at which the shutdown instruction was received the earliest and the exit time of the object that was the last to exit, as recorded by the system during the last system shutdown, may be determined. Hence the time spent on the last system shutdown may be determined.

For a better understanding, the process in the embodiments of the present disclosure for determining the time spent on system shutdown is described using some exemplary application scenarios.

For example, after using the system, the user may shut down the system of a terminal normally, such as by using a system shutdown command as provided by the system. The system programs on the terminal may be notified to exit one after another. The time at which each system program is notified to exit and the actual exit time of each system program may be recorded by the system. For a system program that has a substantially short interval between the time when it is notified and its exit time, it may be understood that the system program exits immediately after it receives the notification. The time at which the system program, in such a case, is notified to exit and the actual exit time of the system program may be deemed as the same time.

At a later time, after the shutdown, the user may want to use the terminal again and may start the terminal. The terminal, during bootup, may access the system event data recorded during the last shutdown. The terminal may compare the time recorded by the system at which each system program was notified to exit. Based on such information, the system may identify a system program that was notified of the shutdown the earliest. The time at which the earliest system program received the notification may be determined as the time at which the shutdown instruction was initiated. The terminal may further search for a system program that exited the latest. The terminal may access actual exit times of each system program as recorded by the terminal during the last shutdown. The terminal may compare the exit times of the system programs to identify the system program that exited the latest. The exit time of the identified system program may be determined as the shutdown time. In this way, the time spent on the last system shutdown may be acquired from the time difference between the shutdown time and the time at which the shutdown instruction was initiated.

When the terminal has been fully started up, the time spent on the last system shutdown may be prompted, or displayed, such as in a window. The user may evaluate whether the system needs to be optimized in view of the displayed time spent on the last system shutdown.

When the terminal receives a logout or rebooting instruction, system programs on the terminal may be notified to exit one after another. The time at which each system program is notified to exit and the actual exit time of each system program may be recorded by the system. For a system program that has a substantially short interval between the time when it is notified and its exit time, it may be understood that the system program exits immediately after it receives the notification. In case of such system programs, the time at which the system program is notified to exit and the actual exit time of the system program may be deemed to be the same.

Once booting starts, the terminal may compare the times recorded by the system at which each system program was notified to exit. Based on the comparison a system program that was notified to exit the earliest may be identified. The time at which the identified earliest system program, that was notified to exit the earliest, received the notification may be determined as the time at which the shutdown instruction was initiated. Further, the terminal may search for a system program that exited the latest by comparing the actual exit times of each system program. The exit time of the system program that exited the last is determined as the shutdown time. The time spent on the last system shutdown may be determined from the time difference between the shutdown time and the time at which the shutdown instruction was initiated.

When the terminal has been fully started up, the time spent on the last system shutdown may be prompted or displayed for a user, such as via a window. The user may evaluate whether the system needs to be optimized according to the time spent on the last system shutdown.

In another example case, the terminal may be shut down due to a sudden power off or in some other abnormal cases. The terminal, in such cases, may or may not determine the time spent on the last system shutdown. This is because, system programs on the terminal may stop abruptly in case the power was suddenly off. In this case, the obtained time spent on system shutdown may not be significant to be used for optimization.

Figure 5:
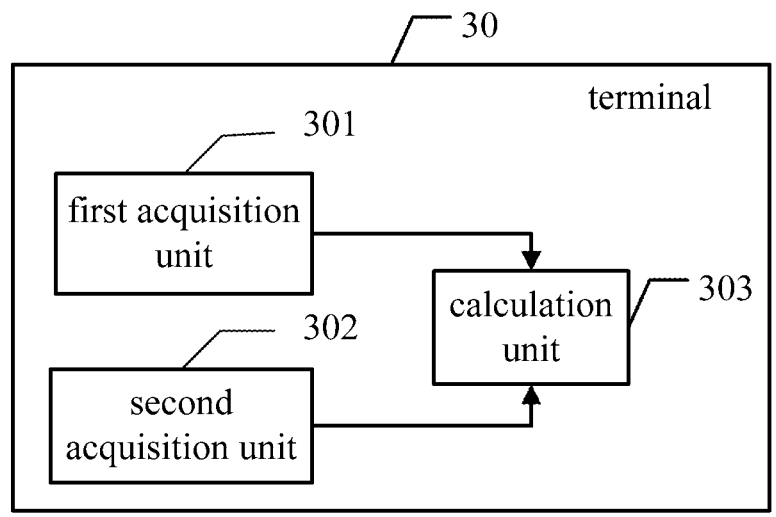
FIG. 5 shows an example terminal according to an embodiment of the present disclosure.

Referring to FIG. 5, an example terminal may include circuitry such as a first acquisition unit 301, a second acquisition unit 302, and a calculation unit 303.

The first acquisition unit 301 may identify a time at which a shutdown instruction is initiated during a system shutdown to shut down the terminal.

The second acquisition unit 302 may identify an exit time of an object that is the last to exit during the system shutdown.

The calculation unit 303 may determine the time spent on the system shutdown based on the time at which the shutdown instruction is initiated as identified by the first acquisition unit 301, and the exit time of the object that is the last to exit as identified by the second acquisition unit 302.

Thus, the first acquisition unit 301 may identify the time at which the shutdown instruction is initiated during the system shutdown. The second acquisition unit 302 may identify the exit time of the object that is the last to exit during the system shutdown. The calculation unit 303 may determine the time spent on the system shutdown according to the time at which the shutdown instruction is initiated and the exit time of the object that is the last to exit. The method and/or terminal for determining time spent on the last system shutdown may determine the system time spent on the last system shutdown each time the system is booting, regardless of the reason that the system was shut down before. For example, the system may have been rebooted to cause the previous shutdown, or the system may have been shutdown using a system shutdown command. In another example, the system may have shutdown due to a power failure, or some other error. The user may be instructed to optimize the system according to the time spent on system shutdown.

Thus, an example system to determine the time spend on a last system shutdown may include at least the following hardware components.

The first acquisition unit 301 that may determine the occurring time of a system event that has the earliest occurring time in a system log during the system shutdown. The system log may be a record of system events that may have occurred during the last system shutdown. The system log may contain an event identifier, a corresponding time at which the event occurred, and an object identifier. The event identifier may be a unique identifier representing the event record. The object identifier may indicate an object on which, or pertaining to which, the event occurred. For example, a system event may be recorded when an object, such as an executing program in the system receives a notification to exit, in response to the system shutdown. In addition, the system log may contain other information related to the event, such as a cause of the event, and an entity that may have initiated the event.

The second acquisition unit 302 may identify the occurring time of a system event that has the latest occurring time from the system log that was recorded during the system shutdown.

The calculation unit 303 may compute the time spent on the system shutdown according to, the occurring time of the system event that has the earliest occurring time and the occurring time of the system event that has the latest occurring time. The occurring times used during the computation may be those recorded in the system log.

In another example, referring to FIG. 5, the circuitry of an example system may include hardware as described below.

The first acquisition unit 301 may identify a first object that is the first to receive the shutdown instruction. The time at which the identified first object received the shutdown instruction during the system shutdown, may be considered a shutdown initiation time.

The second acquisition unit 302 may identify a second object that is the last to receive the shutdown instruction during the system shutdown. The exit time of the identified second object may be considered a shutdown completion time.

The calculation unit 303 may determine the time spent on system shutdown according to the shutdown initiation time and the shutdown completion time.

In yet another example, referring to FIG. 5, the system to determine a duration of the previous system shutdown may include hardware as described further.

The first acquisition unit 301 may identify the time at which a first predetermined object receives the shutdown instruction. The first predetermined object may be preset to receive the shutdown instruction the earliest in each system shutdown.

The second acquisition unit 302 may identify the exit time of a second predetermined object. The second predetermined object may be preset to obtain the shutdown instruction the last in each system shutdown.

The calculation unit 303 may determine the duration of the previous system shutdown based on the time at which the first predetermined object receives the shutdown instruction, and the exit time of the second predetermined object.

Figure 6:
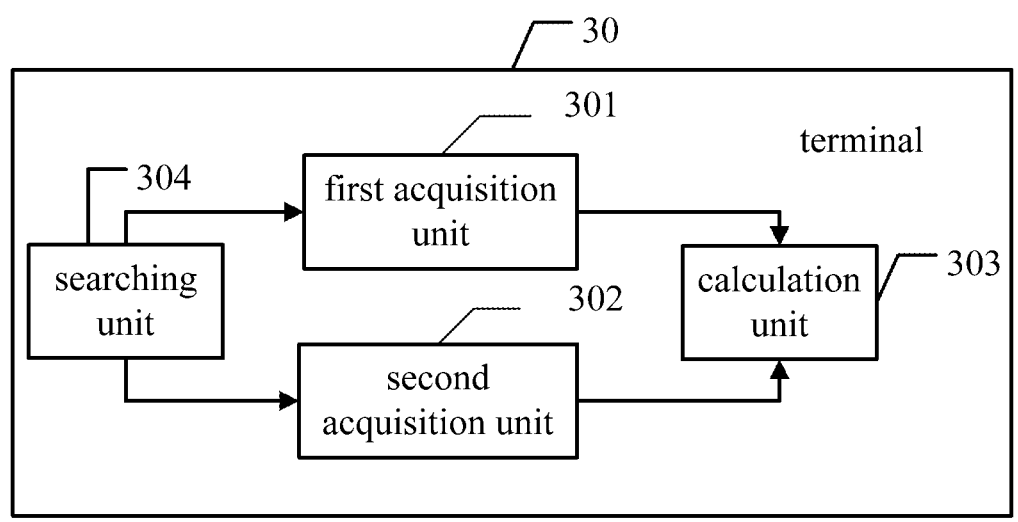
FIG. 6 shows an example terminal according to an embodiment of the present disclosure.

In yet another example, with reference to FIG. 6, the system to determine the time spent on the previous system shutdown may include, in addition to the components described throughout the present disclosure, at least a searching unit 304.

The searching unit 304 may search system records. The searching unit 304 may access system logs during the last system shutdown to identify information to be used to determine the time spent during the shutdown. For example, the searching unit 304 may identify objects in the system log. Further, for each object in the system, the searching unit 304 may search for a time at which the object received the shutdown instruction during the previous shut down. Further yet, the searching unit 304 may also search for and identify an exit time of the object during the system shutdown.

It should be understood by those skilled in the art that all or some of the steps in the methods according to the above embodiments may be implemented by hardware. Further the objects may be stored on a computer readable storage medium such as ROM, RAM, a magnetic disc or an optical disk. Further, the embodiments described throughout the present disclosure may involve hardware that may be controlled by computer executable instructions.

Technical features in methods and systems for determining the time spent on system shutdown are described in detail above. Specific examples are provided to describe the principles and technical features. The description of the embodiments is only used to help understand the technical features and is not to be considered limiting. Moreover, modifications may be made to the embodiments of the present disclosure by those skilled in the art based on the technical features described in the present disclosure. Therefore, the specification shall not be interpreted as limiting the scope of the present disclosure.

The invention claimed is:

1. A computer implemented method for determining time spent on system shutdown, comprising:
   presetting a first program to receive a shutdown instruction the earliest during the system shutdown, a second program to receive the shutdown instruction the last during the system shutdown;
   determining a time at which the first program receives the shutdown instruction;
   determining an exit time of the second program; and
   determining the time spent on the system shutdown based on the time at which the first program receives the shutdown instruction and the exit time of the second program.

2. The method according to claim 1, further comprising:
   searching, for each object in the system, for a time at which the object receives the shutdown instruction and an exit time of the object, wherein the search is conducted in a system log recorded during the system shutdown.

3. A terminal, comprising: a processor and a memory having processor-executable instructions stored therein, and the instructions when executed by the processor, configure the processor to:
   preset a first program to receive a shutdown instruction the earliest during a system shutdown, a second program to receive the shutdown instruction the last during the system shutdown;
   determine a time at which the first program receives the shutdown instruction;
   determine an exit time of the second program; and
   determine the time spent on the system shutdown based on the time at which the first program receives the shutdown instruction and the exit time of the second program.

4. The terminal according to claim 3, wherein the processor is configured to:
   a searching unit, configured to identify, for an object in the terminal, a time at which the object receives the shutdown instruction and an exit time of the object during the system shutdown.

5. A non-transitory storage medium comprising computer executable instructions, wherein the executable instructions are configured to implement a method for determining time spent on system shutdown, and the method comprises:
   presetting a first program to receive a shutdown instruction the earliest during a system shutdown, a second program to receive the shutdown instruction the last during the system shutdown;
   determining a time at which the first program receives the shutdown instruction;
   determining an exit time of the second program; and
   determining the time spent on the system shutdown based on the time at which the first program receives the shutdown instruction and the exit time of the second program.

* * * * *